US008835032B2

(12) United States Patent
Takasaki et al.

(10) Patent No.: US 8,835,032 B2
(45) Date of Patent: Sep. 16, 2014

(54) BATTERY MODULE

(75) Inventors: Hiroshi Takasaki, Osaka (JP); Naoto Hosotani, Osaka (JP); Yasuhiro Asaida, Kyoto (JP); Tsuneyuki Ejima, Osaka (JP); Takuya Nakashima, Osaka (JP)

(73) Assignee: Panasonic Corporation, Osaka (JP)

( * ) Notice: Subject to any disclaimer, the term of this patent is extended or adjusted under 35 U.S.C. 154(b) by 15 days.

(21) Appl. No.: 13/813,331

(22) PCT Filed: May 2, 2011

(86) PCT No.: PCT/JP2011/002532
§ 371 (c)(1),
(2), (4) Date: Jan. 30, 2013

(87) PCT Pub. No.: WO2012/014353
PCT Pub. Date: Feb. 2, 2012

(65) Prior Publication Data
US 2013/0216884 A1 Aug. 22, 2013

(30) Foreign Application Priority Data

Jul. 30, 2010 (JP) ................................ 2010-172456

(51) Int. Cl.
*H01M 10/50* (2006.01)
(52) U.S. Cl.
USPC ......................................................... 429/99
(58) Field of Classification Search
None
See application file for complete search history.

(56) References Cited

U.S. PATENT DOCUMENTS

| | | | |
|---|---|---|---|
| 5,800,937 A * | 9/1998 | Decker et al. ................ 429/7 |
| 2004/0142238 A1 | 7/2004 | Asahina et al. | |
| 2005/0074666 A1 | 4/2005 | Kimiya et al. | |
| 2010/0104927 A1 | 4/2010 | Albright | |
| 2011/0200862 A1 * | 8/2011 | Kurosawa ................ 429/120 |

FOREIGN PATENT DOCUMENTS

| | | |
|---|---|---|
| EP | 2031672 A1 | 3/2009 |
| JP | 2002-124224 A | 4/2002 |
| JP | 2004-111370 A | 4/2004 |
| JP | 2005-322434 A | 11/2005 |
| JP | 2005-339932 A | 12/2005 |
| JP | 2007-066773 A | 3/2007 |
| JP | 2009-176464 A | 8/2009 |
| JP | 2009-301969 A | 12/2009 |

OTHER PUBLICATIONS

International Search Report issued in International Patent Application No. PCT/JP2011/002532 dated Aug. 16, 2011.
Extended European Search Report issued in European Application No. 11811960.1-1360 dated Jun. 30, 2014.

* cited by examiner

*Primary Examiner* — Patrick Ryan
*Assistant Examiner* — Wyatt McConnell
(74) *Attorney, Agent, or Firm* — McDermott Will & Emery LLP

(57) ABSTRACT

A battery module in which the temperature of a cell with an increased high temperature due to an abnormal state can be quickly reduced so that the high temperature does not affect adjacent cells is provided.
A battery module 200 has a configuration in which a plurality of cells 100 as secondary batteries are housed in a case 90 having a plurality of housing parts housing, but not in contact with, the cells 100, and when a gas is generated in one of the cells 100 to cause the cell 100 to expand, this cell 100 comes into contact with the associated one of the housing parts.

5 Claims, 7 Drawing Sheets

BATTERY MODULE

RELATED APPLICATIONS

This application is the U.S. National Phase under 35 U.S.C. §371 of International Application No. PCT/JP2011/002532, filed on May 2, 2011, which in turn claims the benefit of Japanese Application No. 2010-172456, filed on Jul. 30, 2010, the disclosures of which Applications are incorporated by reference herein.

TECHNICAL FIELD

The present disclosure relates to battery modules each including a plurality of secondary batteries.

BACKGROUND ART

With recent diversification of electronic devices, battery modules in each of which a plurality of batteries with high capacity, high voltage, high power, and high levels of safety are housed in a housing are needed. In particular, to provide a battery or a battery module with a high level of safety, there is a known technique that provides the battery or the battery module with various protective means such as a positive temperature coefficient (PTC) device or a thermal fuse for preventing a temperature rise and/or a protective circuit for detecting a battery internal pressure to cut off current. There is also a known technique that provides a battery module with a control circuit for controlling charge and discharge of a battery in order to prevent the battery from being in an abnormal state (e.g., a thermal runaway state).

However, even with the protective means or the control circuit as described above, a battery under abnormal conditions might be at high temperatures or subjected to blowout of a high-temperature flammable gas from the inside of the battery. In this case, the housing of the battery module in which the battery is housed might be broken, fused, or overheated, or the blown-out flammable gas might be leaked to the outside of the battery module.

To prevent such problems, the following methods are proposed. In one method, in a battery module in which a plurality of batteries are housed in a housing, a gas released from the battery is diffused in the housing to have its temperature and pressure reduced, and then is released to the outside of the housing (see, for example, Patent Document 1). In another method, a bag configured to be expanded to have a duct shape is attached to a cell group formed by connecting a plurality of cells each having a safety valve that allows a gas to be released when the internal pressure of the cell exceeds a predetermined level. When a large amount of gas is generated, the bag is expanded to form a duct, and then a gas from the cell is released to the outside, thereby reducing the pressure of the released gas (see Patent Document 2).

The foregoing methods are intended to release a generated gas. Another important means concerning safety is prevention of induction of abnormality in other batteries in a battery module when a battery comes to be in an abnormal state. For example, Patent Document 3 proposes the following battery assembly. In this battery assembly, to effectively prevent thermal runaway of a secondary battery from inducing thermal runaway of another secondary battery in the battery assembly, a plurality of secondary batteries are oriented in parallel with each other and arranged adjacent to each other to be housed in an outer case, and a cooling air duct for cooling the secondary batteries with cooling air is placed in the outer case. In addition, a plastic thermal-runaway prevention wall is provided between adjacent ones of the secondary batteries, and is integrally formed with thermally conductive cylinders through which the secondary batteries are inserted such that the thermal-runaway prevention wall is part of the thermally conductive cylinders. The thermally conductive cylinders have heat dissipation regions where the surfaces of the inserted secondary batteries are partially exposed in the cooling air duct so that parts of the secondary batteries exposed in the heat dissipation regions are cooled by cooling air supplied through the cooling air duct.

CITATION LIST

Patent Document

Patent Document 1 Japanese Patent Publication No. 2005-322434

Patent Document 2: Japanese Patent Publication No. 2005-339932

Patent Document 3: Japanese Patent Publication No. 2007-66773

SUMMARY OF THE INVENTION

Technical Problem

In the technique proposed in Patent Document 3, however, as illustrated in FIG. 5 of Patent Document 3, the temperature of a battery where thermal runaway occurs rises to 400° C. and, even after the lapse of four minutes from the occurrence of thermal runaway, the temperature of this battery is about 300° C. Thus, a dangerous high-temperature state continues for a long period. It is extremely difficult to improve this state as long as the thermal-runaway prevention wall is used.

It is therefore an object of the present disclosure to provide a battery module in which the temperature of a cell at a high temperature due to an abnormal state can be quickly reduced and adjacent cells are not affected by the high temperature.

Solution to the Problem

A battery module according to the present disclosure includes a plurality of cells that are secondary batteries; and a case housing the cells, wherein the case includes a plurality of housing parts respectively housing the cells, each of the cells is not in contact with an associated one of the housing parts, and when a gas is generated in at least one of the cells to cause the cell to expand, the cell comes into contact with an associated one of the housing parts.

The case preferably has a thermal conductivity of 50 W/mK or more.

A holding member having a thermal conductivity of 0.5 W/mK or less and an insulating property may be located in part of a space between each of the cells and an associated one of the housing parts, and the holding member may isolate each of the cells from the associated one of the housing parts.

Advantages of the Invention

The cells are housed in, and not in contact with, the housing parts. When a gas is generated in one of the cells to cause the cell to expand, this cell comes into contact with an associated one of the housing parts. Accordingly, heat from the cell where the gas is generated is diffused in the case to reduce the temperature of the cell. Since the heat from the cell is not transmitted to the other cells where no gas is generated, a temperature rise can be reduced, thus causing no abnormality such as an internal short circuit in the other cells.

DESCRIPTION OF EMBODIMENTS

Figure 1:
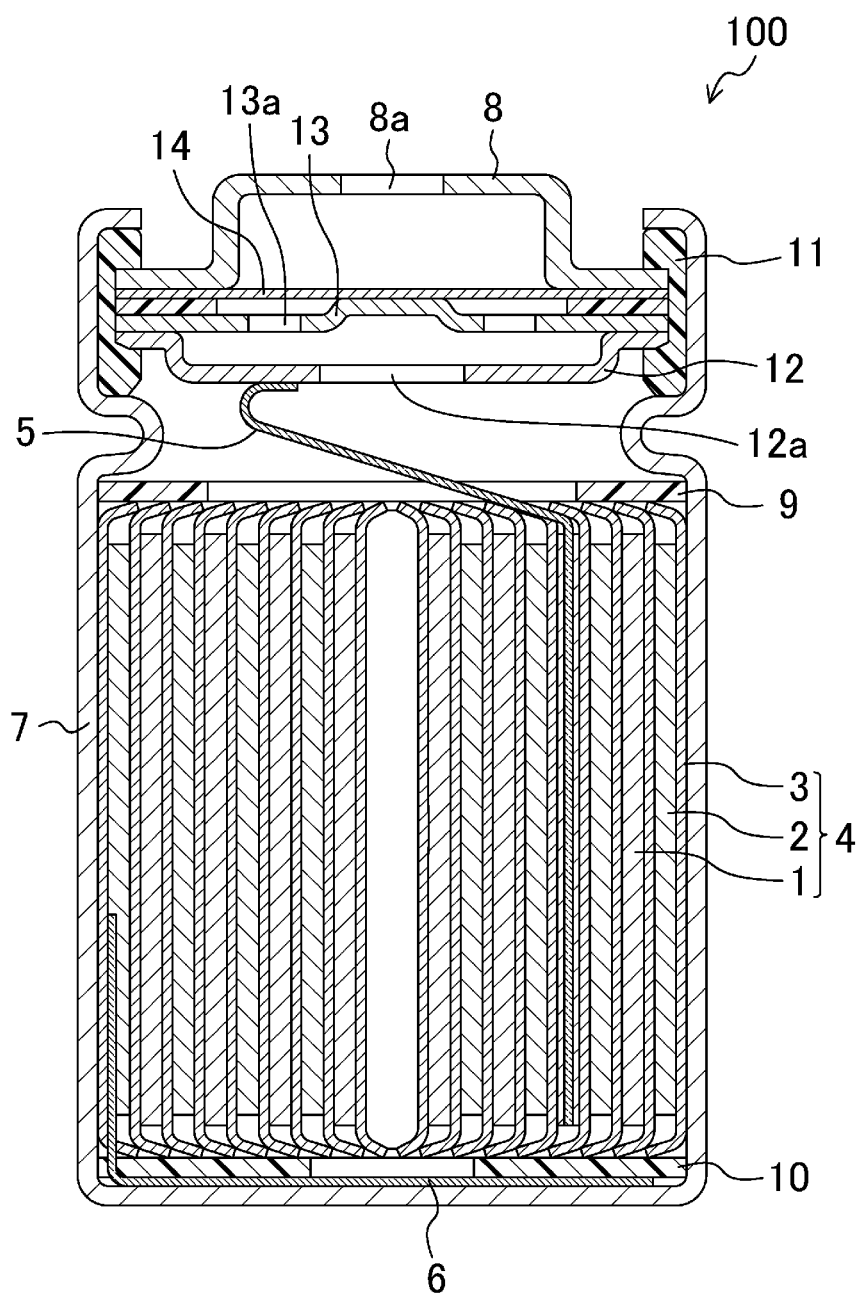
FIG. 1 is a cross-sectional view schematically illustrating a configuration of a cell for use in a battery module according to an embodiment.

First, thermal runaway is described. Thermal runaway refers to a situation where the internal temperature of a battery increases to 200° C. or more for some reasons such as an internal short circuit or overcharge to promote chemical reaction in the battery and to accelerate the temperature rise of the inside of the cell. In this situation, the positive electrode active material and the negative electrode active material in the battery are thermally decomposed, resulting in generation of a high-temperature flammable gas to cause the battery to expand.

Embodiments of the present disclosure will be described hereinafter with reference to the drawings. In the drawings, components having substantially the same functions are denoted by the same reference characters for simplicity.

First Embodiment

<Cell>

FIG. 1 is a cross-sectional view schematically illustrating a configuration of a battery 100 for use in a battery module according to a first embodiment of the present disclosure. The battery for use in the battery module of the first embodiment may be a battery that can be used alone as a power source of portable electronic equipment such as a laptop computer (where a battery for use in a battery module will be hereinafter referred to as a "cell"). In this case, a high performance general-purpose battery can be used as a cell for a battery module, thereby more easily achieving enhanced performance and cost reduction of the battery module.

The cell 100 for use in a battery module of the present disclosure may be a cylindrical lithium ion secondary battery as illustrated in FIG. 1, for example. This lithium ion secondary battery has a general configuration having a safety mechanism which, even when a gas is generated in the cell due to, e.g., an internal short circuit to cause a pressure rise in the battery, allows the gas to be released to the outside of the cell. A configuration of the cell 100 will be specifically described hereinafter with reference to FIG. 1.

As illustrated in FIG. 1, an electrode group 4 formed by winding a positive electrode 1 and a negative electrode 2 with a separator 3 interposed therebetween is housed in a battery case 7 together with an nonaqueous electrolyte. Insulating plates 9 and 10 are disposed on the top and bottom of the electrode group 4. The positive electrode 1 is joined to a filter 12 through a positive electrode lead 5. The negative electrode 2 is joined to the bottom of the battery case 7 also serving as a negative electrode terminal, through a negative electrode lead 6.

The filter 12 is connected to an inner cap 13. A projection of the inner cap 13 is joined to a metal valve plate 14. The valve plate 14 is connected to a terminal plate 8 also serving as a positive electrode terminal. The terminal plate 8, the valve plate 14, the inner cap 13, and the filter 12 together seal an opening of the battery case 7 with a gasket 11 interposed therebetween.

When an internal short circuit occurs in the cell 100 to increase the pressure in the cell 100, the valve plate 14 expands toward the terminal plate 8. Then, when the inner cap 13 and the valve plate 14 are disconnected, a current path is blocked. Thereafter, when the pressure in the cell 100 further increases, the valve plate 14 is broken. Accordingly, a gas generated in the cell 100 is released to the outside through a through hole 12a in the filter 12, a through hole 13a in the inner cap 13, a break in the valve plate 14, and an aperture 8a in the terminal plate 8.

The safety mechanism for releasing the gas generated in the cell 100 to the outside is not limited to the configuration illustrated in FIG. 1, and may have another configuration.

<Battery Module>

Figure 2:
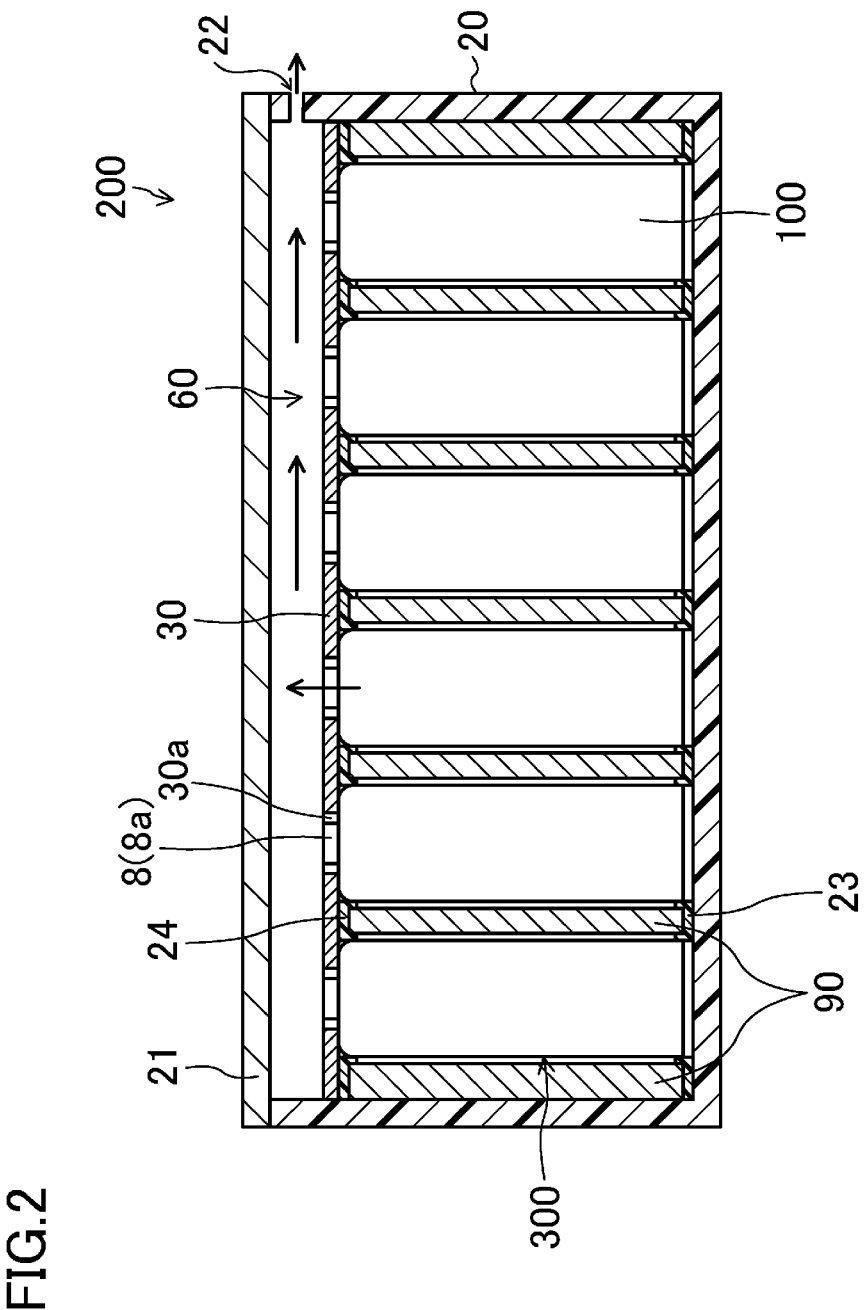
FIG. 2 is a cross-sectional view schematically illustrating a configuration of the battery module of the embodiment.

FIG. 2 is a cross-sectional view schematically illustrating a configuration of a battery module 200 of this embodiment. For viewability, the internal structure of the cell 100 is not shown, and members electrically connecting the cells 100 are not shown, either.

FIG. 2 illustrates an example cross-sectional configuration of a battery assembly 300 in which a plurality of cells 100 are connected in parallel. The battery module 200 illustrated in FIG. 2 has a configuration in which a plurality of battery assemblies 300 are housed in a housing box 20. The battery assembly 300 is a unit constituted by connecting a plurality of cells 100 in parallel. Each of the cells 100 is housed in a case 90 made of aluminium with a high thermal conductivity (237 W/mK). Each of the side surfaces of the substantially cylindrical cells 100 is surrounded by the case 90.

Figure 3:
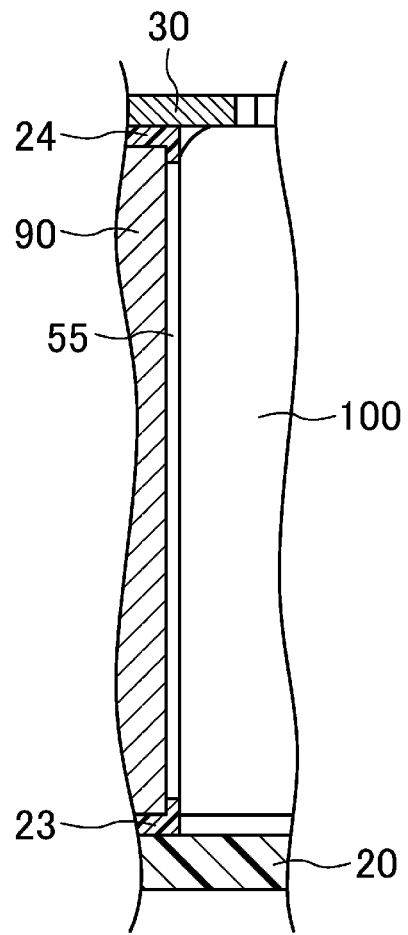
FIG. 3 is an enlarged cross-sectional partial view schematically illustrating the battery module of the embodiment.

As illustrated in FIG. 3 in an enlarged manner, a narrow gap 55 is present between the case 90 and the cell 100 so that the case 90 is not in contact with the cell 100. This gap 55 is formed by first and second holding members 23 and 24 sandwiched between the case 90 and the cell 100. That is, the case 90 and the cell 100 are isolated from each other by the first and second holding members 23 and 24.

Each of the first and second holding members 23 and 24 is made of a synthetic resin having a low thermal conductivity and an insulating property. The first and second holding members 23 and 24 are respectively disposed at the bottom and top of each of the substantially cylindrical cells 100. Accordingly, the gap 55, which is an air layer, occupies most part of the space between the case 90 and the cells 100. In FIG. 2, it appears that a plurality of cases 90 are individually disposed, but actually, the case 90 is continuous in the housing box 20.

As illustrated in FIG. 1, each of the cells 100 has the aperture 8a for releasing a gas generated in the cell 100 to the outside of the cell. The housing box 20 is divided, by a flat plate (a plate-like member) 30 provided at one side (near the positive electrode terminal 8 in this embodiment) of the cells 100, into a cell housing section housing the cells 100 and a gas-releasing path 60 for releasing gas from the apertures 8a of the cells 100 to the outside of the housing box 20. The apertures 8*a* of the cells 100 communicate with the gas-releasing path 60 through openings 30*a* formed in the flat plate 30.

The gas-releasing path 60 is formed between the flat plate 30 and an external plate (a lid) 21 of the housing box 20. A gas released from the aperture 8*a* of any one of the cells 100 is released to the gas-releasing path 60 through an associated one of the openings 30*a* in the flat plate 30, and then is released to the outside of the housing box 20, i.e., the battery module 200, through an outlet 22 provided in the housing box 20.

The flat plate 30 is in close contact with an end (near the positive electrode terminal 8 in this embodiment) of the cells 100, and thus, the cell housing section is hermetically sealed by the flat plate 30. Accordingly, a gas released from the aperture 8*a* of the cell 100 to the gas-releasing path 60 through the opening 30*a* of the flat plate 30 does not return to the cell housing section again.

Figure 4:
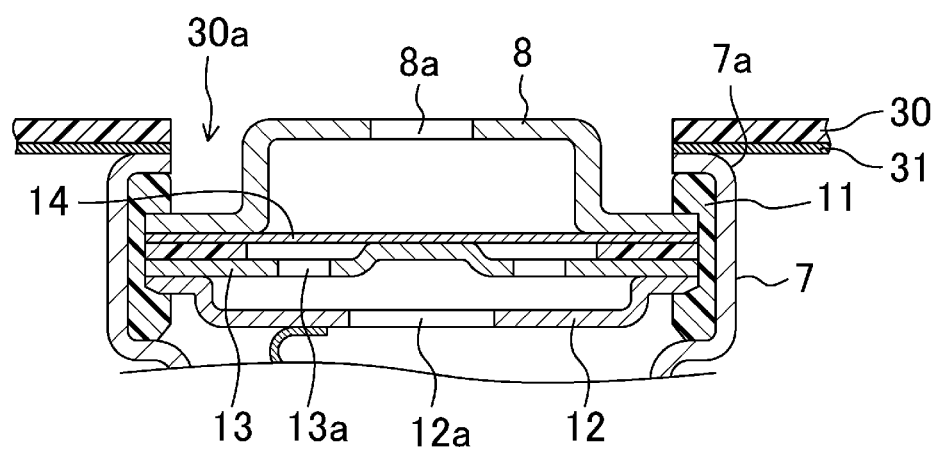
FIG. 4 is an enlarged cross-sectional view illustrating a portion near an end of a cell provided with a flat plate.

FIG. 4 is an enlarged cross-sectional view illustrating a portion near an end of the cells 100 provided with the flat plate 30. As illustrated in FIG. 4, a shoulder 7*a* of the battery case 7 is in contact with the flat plate 30 with an elastic member 31 sandwiched therebetween with the projection of the positive electrode terminal 8 inserted in the opening 30*a* of the flat plate 30. Accordingly, a gas released from the aperture 8*a* in the projection of the positive electrode terminal 8 does not return to the housing section again because the housing section of the cells 100 is hermetically sealed by the flat plate 30. In addition, in a case where the elastic member 31 is adhesive, the flat plate 30 can hold the cells 100. The flat plate 30 may be in direct contact with the shoulder 7*a* of the battery case 7 with no elastic member 31 interposed therebetween.

Figure 5:
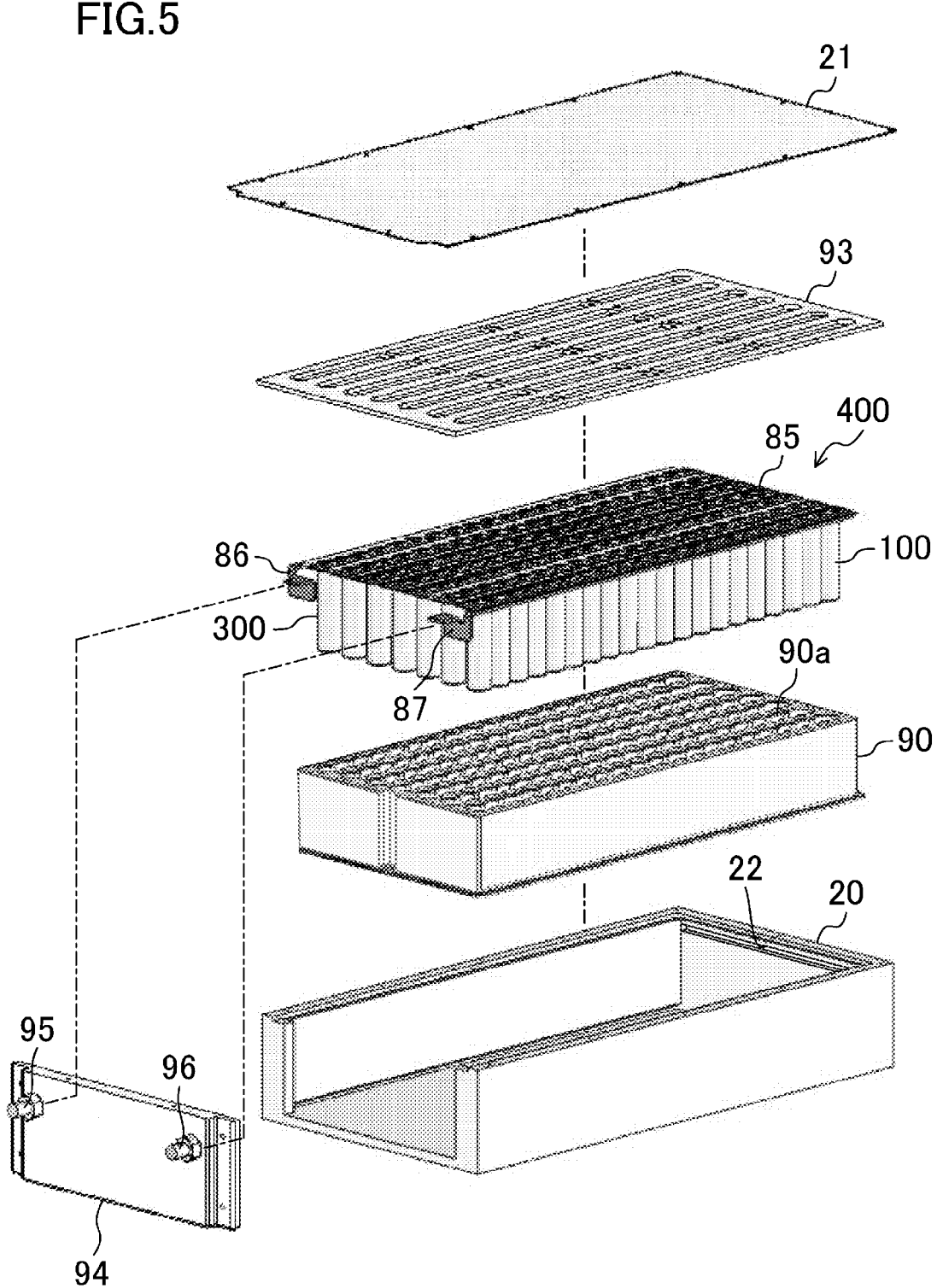
FIG. 5 is a disassembled perspective view illustrating the battery module of the embodiment.
Figure 6:
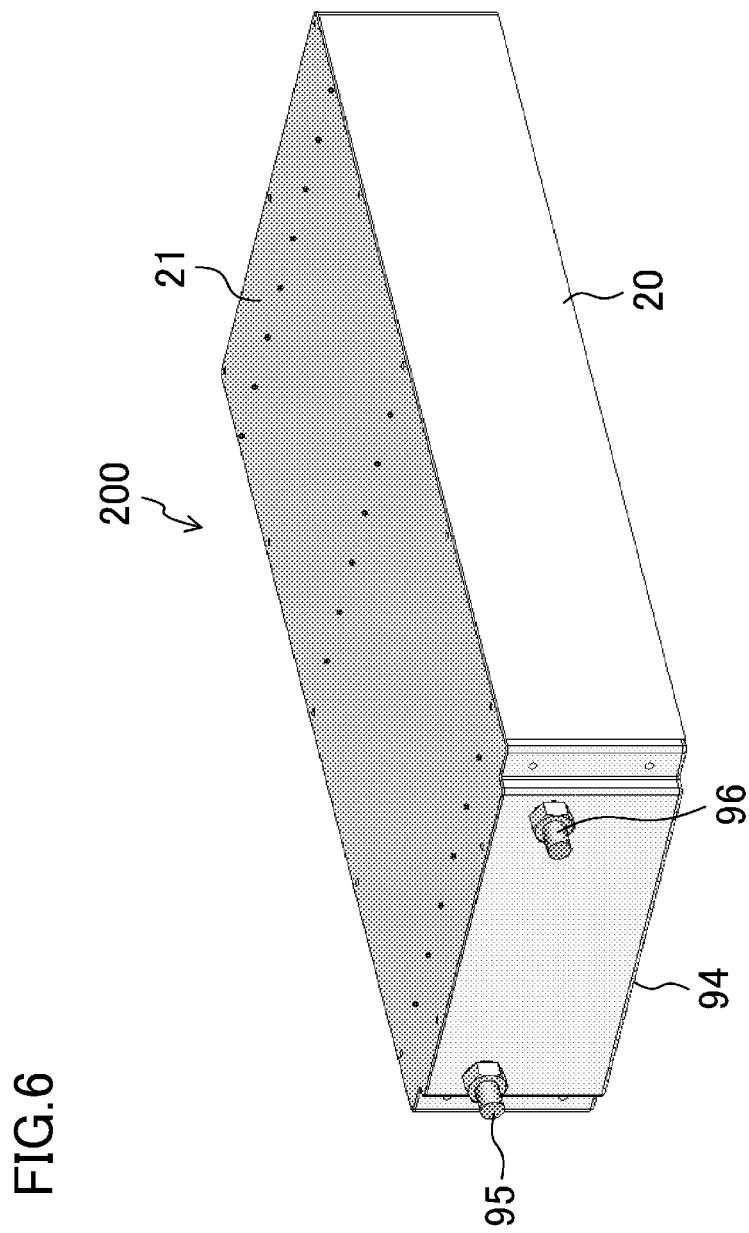
FIG. 6 is a perspective view of the battery module when viewed from the front side thereof.

Referring now to FIGS. 5 and 6, the configuration of the battery module of this embodiment will be described in more detail.

FIG. 5 is a disassembled perspective view illustrating the battery module in more detail. FIG. 6 is a perspective view of the battery module when viewed from above the lid 21.

As illustrated in FIG. 5, the case 90, a unit 400 of the battery assemblies 300, and a resin intermediate panel 93 are housed in the resin housing box 20. The upper surface of the housing box 20 is covered with the metal (e.g., aluminium) external plate (the lid) 21. The front surface of the housing box 20 is covered with a resin front panel 94. The first holding member 23 is hidden under the lower surface of the case 90. The second holding member 24 is hidden under a connection group 85 electrically connecting the cells 100. In the battery assembly unit 400, seven battery assemblies 300 in each of which twenty cells 100 are connected in parallel are connected in series. That is, twenty cells 100 arranged in a line constitute one battery assembly 300, and seven such battery assemblies 300, i.e., seven lines of the cells 100, constitute the battery assembly unit 400. The rear surface of the housing box 20 is provided with the opening (an outlet) 22 for releasing gas from the cells 100 to the outside of the battery module 200.

The gas-releasing path 60 is formed by the lid 21, the intermediate panel 93, and the upper surface of the battery assembly unit 400, and has portions that are independent of each other for the respective battery assemblies 300. Specifically, in this battery module 200, the gas-releasing path 60 is divided into seven rows, which communicate with each other through the opening 22 but are isolated from each other to prevent a gas from flowing from one row to another. More specifically, the intermediate panel 93 is provided with a partition extending from the flat plate 30 to the lid 21. This partition divides the gas-releasing path 60 into the seven rows. The opening 22 extends substantially across the entire width of the rear surface of the housing box 20, and is directly connected to each row of the gas-releasing path 60.

The cells 100 are connected to each other in series and/or in parallel by the connection group 85. The connection group 85 includes a negative electrode bus bar connecting the negative electrodes of the cells 100 in parallel and a positive electrode bus bar connecting the positive electrodes of the cell 100 in parallel. The positive electrode bus bar is connected to a positive electrode terminal 87 of the battery assembly unit 400. The positive electrode terminal 87 is connected to a positive electrode terminal 96 for external connection provided in the front panel 94. The negative electrode bus bar is connected to a negative electrode terminal 86 of the battery assembly unit 400. The negative electrode terminal 86 is connected to a negative electrode terminal 95 for external connection provided in the front panel 94.

As illustrated in FIG. 5, the case 90 has a plurality of housing parts 90*a* respectively housing the cells 100 constituting the battery assembly unit 400. Each of the housing parts 90*a* is in the shape of a cylindrical through hole. Each of the cells 100 is housed in this cylindrical hole, and is held not to be in contact with the case 90 by the first holding member 23 and the second holding member 24.

With the foregoing configuration, even when abnormality occurs in one of the cells 100 in the battery assembly unit 400 to cause thermal runaway therein, a gas blowing out from the abnormal cell 100 is released through the gas-releasing path 60, and the generated heat is diffused and dissipated, without a significant influence on normal adjacent cells 100, i.e., without occurrence of thermal runaway in the normal adjacent cells 100. The mechanism of this diffusion and dissipation of heat is a mechanism of diffusion and dissipation of heat due to the presence of the gap 55 between the cells 100 and the case 90.

When a high-temperature gas from the cell 100 is released from the opening 22 through the gas-releasing path 60, isolation of the cell housing section from the gas-releasing path 60 by the flat plate 30 allows the gas, even a high-temperature gas blowing out from one of the cells 100, to pass through the gas-releasing path 60 to be released to the outside of the battery module 200, without coming in contact with the other cells 100.

Then, the mechanism of diffusion and dissipation of heat described above will be more specifically described.

Figure 7:
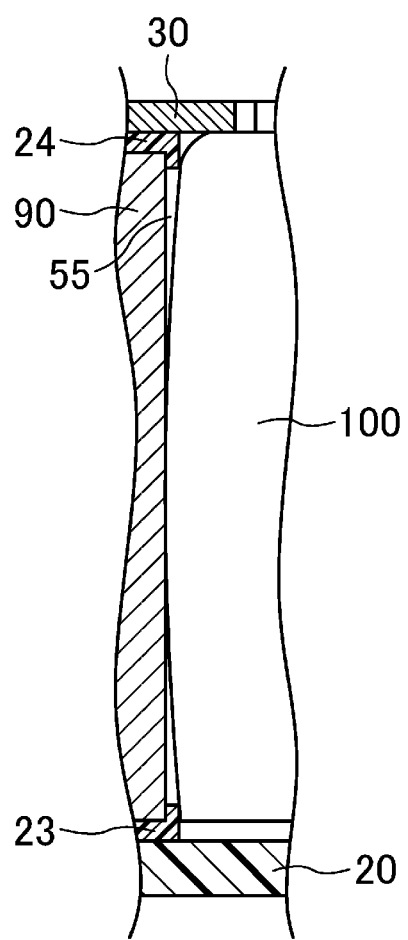
FIG. 7 is an enlarged partial view schematically illustrating a state in which a gas is generated in a cell in the battery module of the embodiment.

When all the cells 100 constituting the battery assembly unit 400 perform charge/discharge operation under normal conditions (without failure), the cells 100 are isolated from the case 90, and the gap 55 is present between the cells 100 and the case 90. However, when abnormality occurs in one of the cells 100 to cause thermal runaway therein, the cell 100 where the thermal runaway occurs is expanded by a flammable gas generated in the cell 100 and comes into contact with the case 90, thereby transmitting heat caused by the thermal runaway to the case 90. FIG. 7 illustrates a state in which the side wall of the cell 100 is in contact with the case 90. Since the case 90 is made of aluminium with a high thermal conductivity (237 W/mK under 0° C.), heat from the cell 100 where thermal runaway occurs is diffused in the entire case 90 and is then dissipated from the outer surface of the case 90.

The heat diffusion reduces the temperature of the case 90 immediately after the heat diffusion to about 100° C., heat conduction from the case 90 does not cause a temperature rise because the cells 100 except the cell 100 under the thermal runaway situation are not in contact with the case 90. Accordingly, no abnormality occurs in the cells 100 except the cell 100 under the thermal runaway situation, and thermal runaway is not distributed in the battery assembly unit 400 in a chain reaction manner. The temperatures of the cells 100 except the cell 100 where thermal runaway occurs increase to some degrees by heat radiation from the case 90, but do not increase to a temperature at which thermal runaway occurs. In addition, heat dissipation from the outer surface of the case 90 quickly reduces the temperature of the case 90.

The technique described in Patent Document 3 is intended to prevent heat transmission to normal cells by stopping heat diffusion. On the other hand, this embodiment is intended to reduce the temperature by quickly diffusing heat in a wide range, and in addition, to reduce transmission of the heat to the normal cells 100.

To achieve the mechanism of diffusion and dissipation of heat described above, the distance between the case 90 and the cell 100 in the gap 55 (hereinafter referred to as an "isolation distance") and the proportion of the gap 55 in the space between the case 90 and the cell 100 (hereinafter referred to as a "gap proportion") are important. The appropriate isolation distance varies depending on the size and shape of the cell 100, materials such as the active material and the electrolyte material in the cell 100, etc. For example, in an 18650 lithium ion battery, the isolation distance is preferably 0.5 mm or less. However, in consideration of dimensional tolerances in fabrication of the case 90 and dimensional tolerances of the cells themselves, it is difficult to reduce the isolation distance to an extremely small value. The gap proportion is preferably as large as possible. The gap proportion is preferably in the range of 60% or more where contact between the case 90 and the cell 100 at the occurrence of thermal runaway is ensured, and more preferably in the range of 80% or more where heat diffusion is ensured.

Since each of the first holding member 23 and the second holding member 24 is made of a material with a low thermal conductivity (e.g., polyurethane having a thermal conductivity of 0.26 W/mK), the case 90 and the cell 100 are substantially thermally in noncontact relation with each other irrespective of contact of the holding members 23 and 24 with both of the case 90 and the cell 100. In addition, each of the first holding member 23 and the second holding member 24 has a shape and a size satisfying the above-described ranges of the isolation distance and the gap proportion.

As described above, in the battery module 200 of this embodiment, since the case 90 and each cell 100 are thermally in noncontact relation with each other and the gap 55 is provided between the case 90 and the cell 100, even when abnormality occurs in one of the cells 100 to cause thermal runaway therein, no thermal runaway is induced in the other cells 100, and a temperature rise in the entire battery module 200 can be reduced. In addition, since the case 90 is made of aluminium, the weight of the battery module 200 can be reduced. The outer surface of the case 90 may be anodized. In this case, even when the case 90 is touched by a human for repair after occurrence of thermal runaway in the cell 100, there is no danger because the outer surface of the case 90 has an insulating property.

Second Embodiment

A battery module according to a second embodiment is the same as that of the first embodiment except for the holding member for isolating the cells from the case. Thus, only different aspects will be described below.

Figure 8:
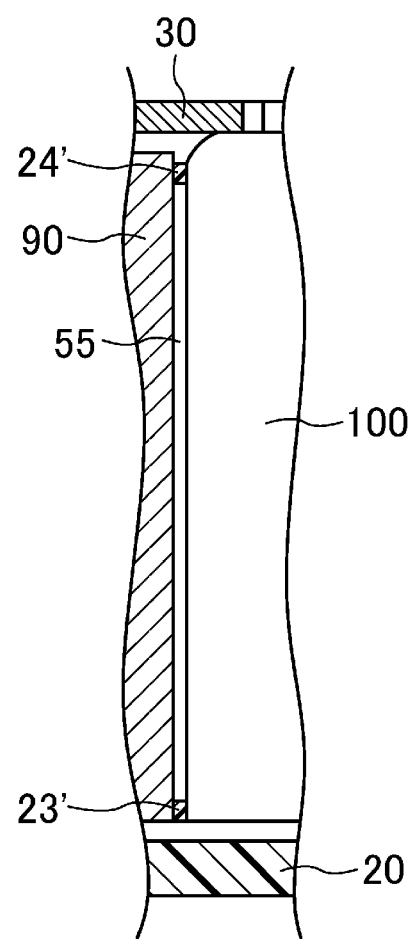
FIG. 8 is an enlarged cross-sectional partial view schematically illustrating a battery module according to another embodiment.

As illustrated in FIG. 8, in the battery module of this embodiment, rings 23' and 24' each having a low thermal conductivity are provided on the side surface of each cell 100 near the upper and lower ends thereof such that the rings 23' and 24' and the cell 100 are fixed. The rings 23' and 24' serve as a holding member. The rings 23' and 24' may be made of the same material as the material for the first holding member 23 and the second holding member 24 of the first embodiment. The rings 23' and 24' are preferably located on the side surface of the cell 100 near the upper and lower ends thereof so as to maximize the area on the side surface of the cell 100 that is in contact with a case 90 when a flammable gas is generated in the cell 100. After the rings 23' and 24' have been placed and fixed on the cell 100, the cell 100 is inserted in a housing part of the case 90. In consideration of friction drag in the insertion, the rings 23' and 24' are preferably fixed with an adhesive or fastened on the cell 100 by an elastic force. A lubricant or a material with a low friction drag is preferably used so as reduce the friction coefficients of the surfaces of the rings 23' and 24' that come into contact the case 90.

The battery module of the second embodiment has advantages similar to those of the first embodiment. In addition, the battery module of the second embodiment can reduce the number of parts in the module, thereby further reducing the cost, as compared to the first embodiment.

Other Embodiments

The foregoing embodiments are merely examples, and the present disclosure is not limited to these examples. The shape and size of the cells are not specifically limited. Each of the cells may be a prismatic cell or a columnar cell whose rectangular cross section has its shorter straight sides replaced by semicircles, or may be cells having other shapes.

The case may be made of a metal with a high thermal conductivity, a material as a mixture of plastics and a filler (e.g., carbon) with a high thermal conductivity, a resin with a high thermal conductivity, or carbon fibers. The case only needs to have a thermal conductivity of 50 W/mK or more as a whole. For example, the case as a whole only needs to have a thermal conductivity greater than or equal to that of carbon steel (thermal conductivity: 50 W/mK). The case preferably has a thermal conductivity of 100 W/mK or more as a whole because heat is quickly diffused in this range.

The battery module may have a mechanism for cooling the case. For example, the outer surface of the case may be cooled by air or by water.

One module only needs to include two or more cells. This is because the present disclosure is directed to provide an advantage in which even when thermal runaway occurs in one of the cells in one module, no thermal runaway occurs in the other cell(s).

The first holding member 23 and the second holding member 24 only need to have shapes that can isolate the cells 100 from the case 90, and do not need to have shapes of being in contact with the housing box 20 and the flat plate 30 as illustrated in FIGS. 2 and 3. The holding member preferably has a thermal conductivity of 0.5 W/mK or less. In this case, the cells and the case are sufficiently thermally in noncontact relation with each other. Examples of a material with a thermal conductivity of 0.5 W/mK or less include polycarbonate (0.19 W/mK), polystyrene (0.11 W/mK), and air (0.03 W/mK). Thermal conductivities of 0.2 W/mK or less are more preferable because the cells can be more effectively thermally isolated from the case. One holding member may be provided to one cell. The holding member may be a plurality of projections fixed to the inner wall of the housing part 90a.

INDUSTRIAL APPLICABILITY

As described above, the battery module of the present disclosure can reduce a chain of occurrences of thermal runaway, and thus, is useful as a battery module using a lithium ion battery, for example.

DESCRIPTION OF REFERENCE CHARACTERS

23 first holding member
24 second holding member
90 case
90a housing part
100 cell
200 battery module

The invention claimed is:

1. A battery module, comprising:
a plurality of cells that are secondary batteries; and
a case housing the cells, wherein
the case includes a plurality of housing parts respectively housing the cells,
each of the cells is not in contact with an associated one of the housing parts, and
when a gas is generated in at least one of the cells to cause the cell to expand, the cell comes into contact with an associated one of the housing parts so that heat from the cell is conducted to the case.

2. The battery module of claim 1, wherein
the case has a thermal conductivity of 50 W/mK or more.

3. The battery module of claim 1, wherein
a holding member having a thermal conductivity of 0.5 W/mK or less and an insulating property is located in part of a space between each of the cells and an associated one of the housing parts, and
the holding member isolates each of the cells from the associated one of the housing parts.

4. The battery module of claim 1, wherein
each of the cells has a columnar shape, and
each of the housing parts surrounds a side surface of an associated one of the cells.

5. The battery module of claim 4, wherein
the holding member is made of rings fixed to the side surface of each of the cells near upper and lower ends of the side surface.

* * * * *